United States Patent
Florence

(10) Patent No.: US 7,925,524 B2
(45) Date of Patent: Apr. 12, 2011

(54) METHOD AND SYSTEM OF DELIVERING ITEMS USING OVERLAPPING DELIVERY WINDOWS

(75) Inventor: William T. Florence, Wilbraham, MA (US)

(73) Assignee: United Parcel Service of America, Inc.

(*) Notice: Subject to any disclaimer, the term of this patent is extended or adjusted under 35 U.S.C. 154(b) by 2499 days.

(21) Appl. No.: 09/851,480

(22) Filed: May 9, 2001

(65) Prior Publication Data

US 2002/0007299 A1      Jan. 17, 2002

Related U.S. Application Data

(60) Provisional application No. 60/218,458, filed on Jul. 14, 2000.

(51) Int. Cl.
*G06F 17/30* (2006.01)

(52) U.S. Cl. .......................................................... 705/7

(58) Field of Classification Search ................ 705/8, 28, 705/7

See application file for complete search history.

(56) References Cited

U.S. PATENT DOCUMENTS

| | | | |
|---|---|---|---|
| 5,541,848 A | 7/1996 | McCormack et al. | |
| 5,615,121 A | 3/1997 | Babayev et al. | |
| 5,692,125 A | 11/1997 | Schloss et al. | |
| 5,922,040 A | 7/1999 | Prabhakaran | |
| 5,970,466 A | 10/1999 | Detjen et al. | |
| 6,029,140 A * | 2/2000 | Martin et al. | 705/11 |
| 6,038,668 A * | 3/2000 | Chipman et al. | 726/30 |
| 6,073,110 A | 6/2000 | Rhodes et al. | |
| 6,085,170 A * | 7/2000 | Tsukuda | 705/26 |
| 6,088,648 A | 7/2000 | Shah et al. | |
| 6,240,362 B1 | 5/2001 | Gaspard, II | |
| 7,251,612 B1 | 7/2007 | Parker et al. | |
| 7,487,105 B2 * | 2/2009 | Jacobs et al. | 705/8 |

FOREIGN PATENT DOCUMENTS

| | | |
|---|---|---|
| JP | 10-97576 | 4/1989 |
| JP | 11-304522 | 11/1999 |

OTHER PUBLICATIONS

Dumas et al (The Pickup and Delivery Problem with Time Windows); Sep. 1991; European Journal of Operational Research, Amsterdam; vol. 54; p. 7, 16 pgs.*
David (Core Competency); Oct. 1999; Traffic World Magazine; Dialog file 637.*
Bilge et al (A time window approach to simultaneous scheduling of machines and material handling system in an FMS); Dec. 1995; Operations Research, Linthicum vol. 43, Iss, 6; p. 1058, 13 pgs.*
Weigel et al (Applying GIS and or techniquesto solve Sears technician-dispatching and home-delivery problems); Feb. 1999; Interfqace. Lithicum, vol. 29, Iss 1; p. 112, 19 pgs.*
Bierdman, David, Core Competency, Traffic World magazine, Oct. 4, 1999, Special Report pp. 26-28.
Comment in an online Blog re. UPS, http://solo2.org/blogs/christoc/archive/2004/10/08/112341.aspx.

* cited by examiner

*Primary Examiner* — Romain Jeanty
(74) *Attorney, Agent, or Firm* — Alston + Bird, LLP

(57) ABSTRACT

A method and system for obtaining desired times from intended recipients of items is provided. The method provides each recipient with a plurality of time windows that overlap with one another in time from which the recipient may choose a time for delivery of an item and receives choices made by recipients from the plurality of overlapping windows. One aspect of the invention includes applying predetermined parameters to the time windows to determine which time windows to offer to the recipients as available times from which the recipient may choose a time for delivery. Such parameters may include, among others, which time windows have associated with them the least cost of service in making the delivery, whether the cost of delivering within a time window is less than a monetary threshold, and whether a maximum number of orders to be delivered within one time window has been reached.

11 Claims, 9 Drawing Sheets

ORDER WINDOW BREAK DOWN
CURRENT MODEL

|  |  | ORDERS |  |
|---|---|---|---|
| HOURS |  | HOUR | WINDOW |
| 7-8 | 7-9 | 15 | 30 |
| 8-9 |  | 15 |  |
| 9-10 | 9-11 | 15 | 30 |
| 10-11 |  | 15 |  |
| 11-12 | 11-13 | 15 | 30 |
| 12-13 |  | 15 |  |
|  |  | 90 | 90 |
| 16-17 | 16-18 | 15 | 30 |
| 17-18 |  | 15 |  |
| 18-19 | 18-20 | 15 | 30 |
| 19-20 |  | 15 |  |
| 20-21 | 20-22 | 15 | 30 |
| 21-22 |  | 15 |  |
|  |  | 90 | 90 |

| DAILY TOTALS |  | 180 | 180 |
|---|---|---|---|

| DRIVERS |  |  |  |
|---|---|---|---|
| 2 SPORH | 7.5 | 4 SPORH | 3.75 |
| 3 SPORH | 5.0 | 5 SPORH | 3.00 |

| WEEKLY TOTALS |  |  | 990 |
|---|---|---|---|
| (INCLUDES SATURDAY) |  |  |  |

*FIG. 1.*
*(PRIOR ART)*

METHOD AND SYSTEM OF DELIVERING ITEMS USING OVERLAPPING DELIVERY WINDOWS

CROSS-REFERENCE TO RELATED APPLICATIONS

The present application claims priority from U.S. Provisional Patent Application Ser. No. 60/218,458, entitled "Overlapping Delivery Windows", filed on Jul. 14, 2000, the contents of which are incorporated herein by reference.

FIELD OF THE INVENTION

The invention relates to a method and system for delivering items to a plurality of addresses within time windows requested by the intended recipients. The invention finds applicability in grocery delivery, consumer products delivery and other delivery industries.

BACKGROUND OF THE INVENTION

The advent of the Internet has transformed consumer product shopping. More and more, consumers are ordering products on-line via the Internet for delivery to the home or place of business. For customer convenience, businesses offering Internet shopping or telephone ordering often provide delivery of purchased items at a time specified by the consumer. The delivery time selected by the consumer must generally be chosen within a specified time window and the items are delivered by the business at any time within that particular window. FIG. 1, for example, shows diagrammatically a typical selection of time windows conventionally offered for a particular day for delivery of consumer products. The available time windows follow each other sequentially; for example 7:00 to 9:00 a.m., 9:00 to 11:00 a.m. and 11:00 to 1:00 p.m.

Convenience and dependability are the two hallmarks of a successful product delivery service. Because individual consumers have jobs and other commitments that make it difficult for them to wait at home for extended periods of time to receive a delivery, it is essential that distributors have the ability to make a delivery within a narrow time window and to be able to reliably deliver within the promised time window. Without this convenience and dependability, many customers will not use product delivery services. Instead, these customers will simply drive or walk to a retailer to purchase and pick up their needed goods in person.

Many times, a consumer is not available to take a delivery at a specific time within the available time window. For example, if a consumer is not available to take a delivery at 7:00 a.m., but would be available at 8:00 a.m. or 9:00 through 11:00 a.m., the consumer must wait until the 9:00 to 11:00 a.m. window to take delivery under conventional systems, which may not be as convenient as taking delivery at 8:00 a.m. Thus, if a consumer is unavailable to take a delivery at any specific time within a time window, it is not possible for the consumer to take delivery at any other time within that window. In other words, if a consumer is unavailable for only fifteen minutes within a two hour window, the consumer will have to wait until the next available two hour delivery time window for delivery.

A separate problem that arises in conventional delivery systems is that a delivery vehicle may be passing near the consumer's location within one time window, but may have to return to the location within another time window if the consumer has ordered products within that other time window, at considerable extra expense. This problem arises because the current model for dispatch of the routes is focused on time commitments and not the physical location of the destinations for the deliveries. The current models, therefore, result in drivers traveling excessive miles and incurring excessive down time in order to complete deliveries during their scheduled time windows, resulting in higher labor and delivery costs to the business and consumer. While current delivery solutions have attempted to optimize deliveries within smaller sequential time windows to give purchasers more choice, they have not solved many of the problems associated with conventional delivery models.

Consequently, there is a need for a method and system for delivering items to consumers that provides more flexibility to consumers to choose delivery times and more efficiency in executing the deliveries to the consumers. Such a system would reduce labor and delivery costs to the business and the consumer, increase the number of deliveries available, provide the consumer with better service and reduce consumer frustration with current delivery models.

SUMMARY OF THE INVENTION

These and other objects and advantages are met by the present invention which includes a method and system for obtaining desired times from intended recipients of items using overlapping time windows. In particular, the advantageous method according to the present invention provides each recipient with a plurality of time windows that overlap with one another in time from which the recipient may choose a time for delivery of an item and receives choices made by recipients from the plurality of overlapping time windows. The plurality of time windows offered to the recipient include at least two sequential time windows and at least one overlapping time window that overlaps each of the sequential time windows.

Preferably, the overlapping time windows include at least two sequential time windows that are two hours long and at least one overlapping time window that overlaps each of the sequential time windows by one hour. The present invention could include other configurations such as at least two sequential one hour time windows and at least one overlapping time window that overlaps each of the sequential time windows by one-half hour.

Another advantageous feature of the present method for delivering items includes applying predetermined parameters to the time windows to determine which time windows to offer to the recipients as available times from which the recipient may choose a time for delivery of an item. Such parameters may include, among others, which time windows have associated with them the least cost of service in making the delivery, whether the cost of delivering the item within a time window is less than a monetary threshold, and whether a maximum number of orders to be delivered within one time window has been reached.

To facilitate use of the present method for obtaining desired times from intended recipients of items using overlapping time windows, a system for implementing an on-line program for delivering items is provided. The system includes an Internet webpage accessible to a user for on-line interactive communications between the user and the Internet webpage, software for offering items for sale to the user and for receiving delivery requests from the user. The system also includes a first memory area for storing the plurality of overlapping time windows from which the user may choose a time for delivery of an item and a scheduling engine for determining available delivery time windows from the plurality of overlapping time windows stored in the first memory area and offering the available delivery time windows to the user. The system also includes a second memory area for receiving and storing the delivery time window choices made by the user.

Advantageously, the scheduling engine of the system may be programmed to apply predetermined parameters to the time windows to identify a subset of time windows to offer to recipients as available times for delivery. As described above, the scheduling engine may be programmed to determine which time windows have the least cost of service in making the delivery to the recipient, whether the cost of delivering the item within a time window of the plurality is less than a monetary threshold or whether a maximum number of orders to be delivered within one of said plurality of time windows has been reached.

In one embodiment, the system for implementing an on-line program for delivering items also includes a routing engine programmed to determine the optimum delivery route for delivering the item to the user.

BRIEF DESCRIPTION OF THE DRAWINGS

Some of the advantages of the present invention have been stated, others will appear as the description proceeds, when considered in conjunction with the accompanying drawings, which are not necessarily drawn to scale, in which:

FIG. 1 is a schematic diagram of a prior art model for delivering ninety (90) delivery orders per shift;

DETAILED DESCRIPTION OF THE INVENTION

Figure 2:
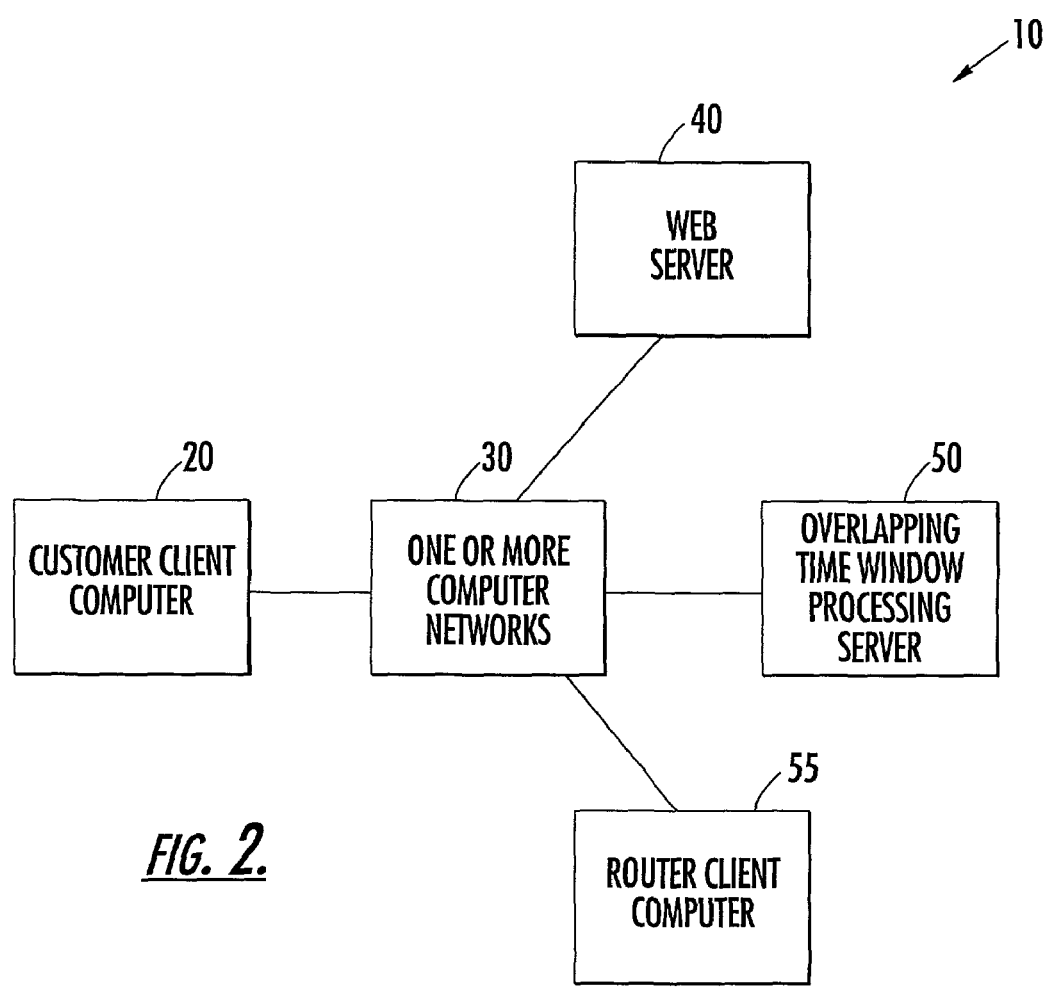
FIG. 2 is a first block diagram of a system that incorporates an embodiment of the present invention.

The present invention will now be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product.

Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams or flowchart illustrations of methods, apparatuses (i.e., systems) and computer program products according to an embodiment of the invention. It will be understood that each block of the block diagrams or flowcharts, and combinations of blocks in the block diagram and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of structure that perform the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention is a method and system of obtaining desired delivery times from intended recipients of items. An embodiment of the invention will be described in connection with an Internet grocery delivery service. It should be understood, however, that the invention is applicable to delivery of other types of goods and items.

FIG. 2 is a block diagram of an overlapping time window processing system 10 in accordance with an embodiment of the present invention. As may be understood from this figure, the overlapping time window processing system 10 includes a customer client computer 20, one or more computer networks 30, a web server 40, an overlapping time window processing server 50, and a router client computer 55. As can be appreciated by one of ordinary skill in the art, the one or more computer networks 30 facilitate communication between the customer client computer 20, the web server 40, the overlapping time window processing server 50, and the router client computer 55. These one or more computer networks 30 may include any of a variety of types of computer networks such as the Internet, a private intranet, a public switch telephone network (PSTN), or any other type of network known in the art. In the embodiment of the invention shown in FIG. 3, the communication link between the customer client computer 20 and the web server 40 is implemented via the Internet 32 using Internet protocol (IP), and the communication links between the web server 40, the overlapping time window processing server 50, and the router client computer 55 are implemented via a Local Area Network (LAN) 35.

Figure 3:
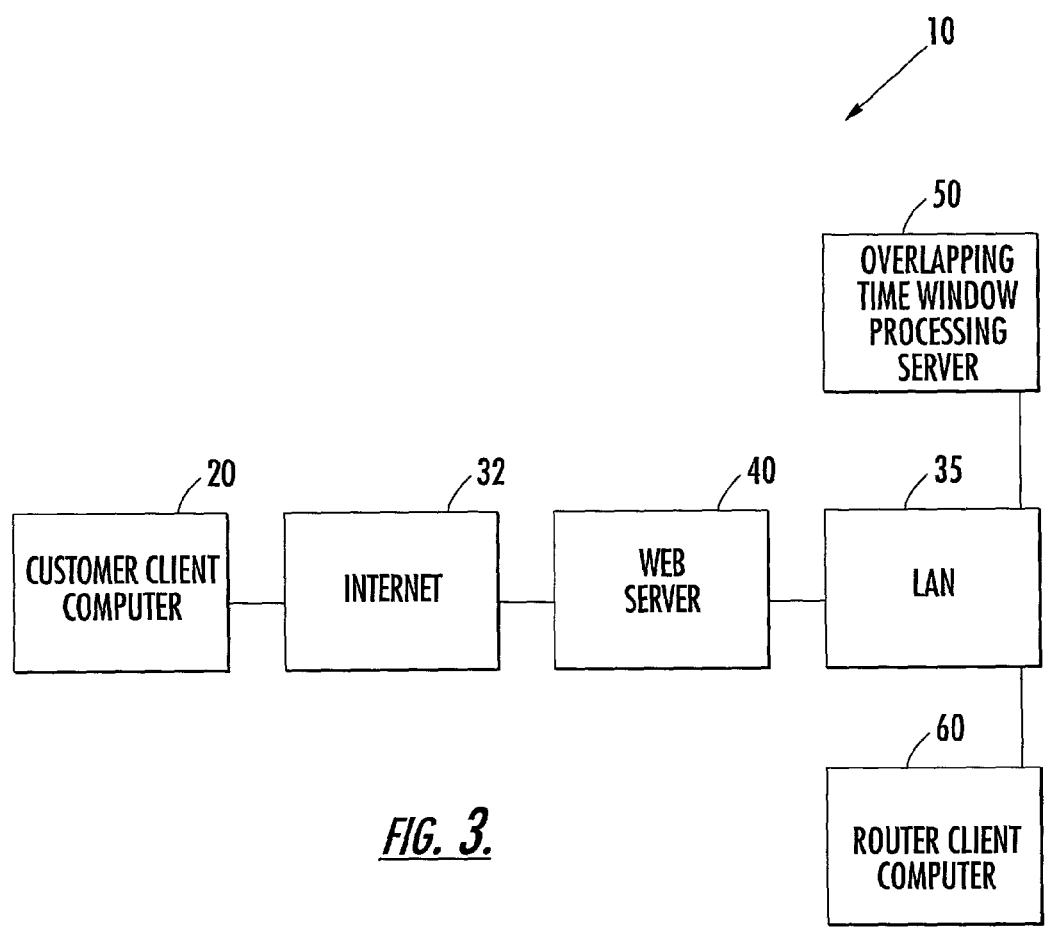
FIG. 3 is a second block diagram of a system that incorporates an embodiment of the present invention.
Figure 4:
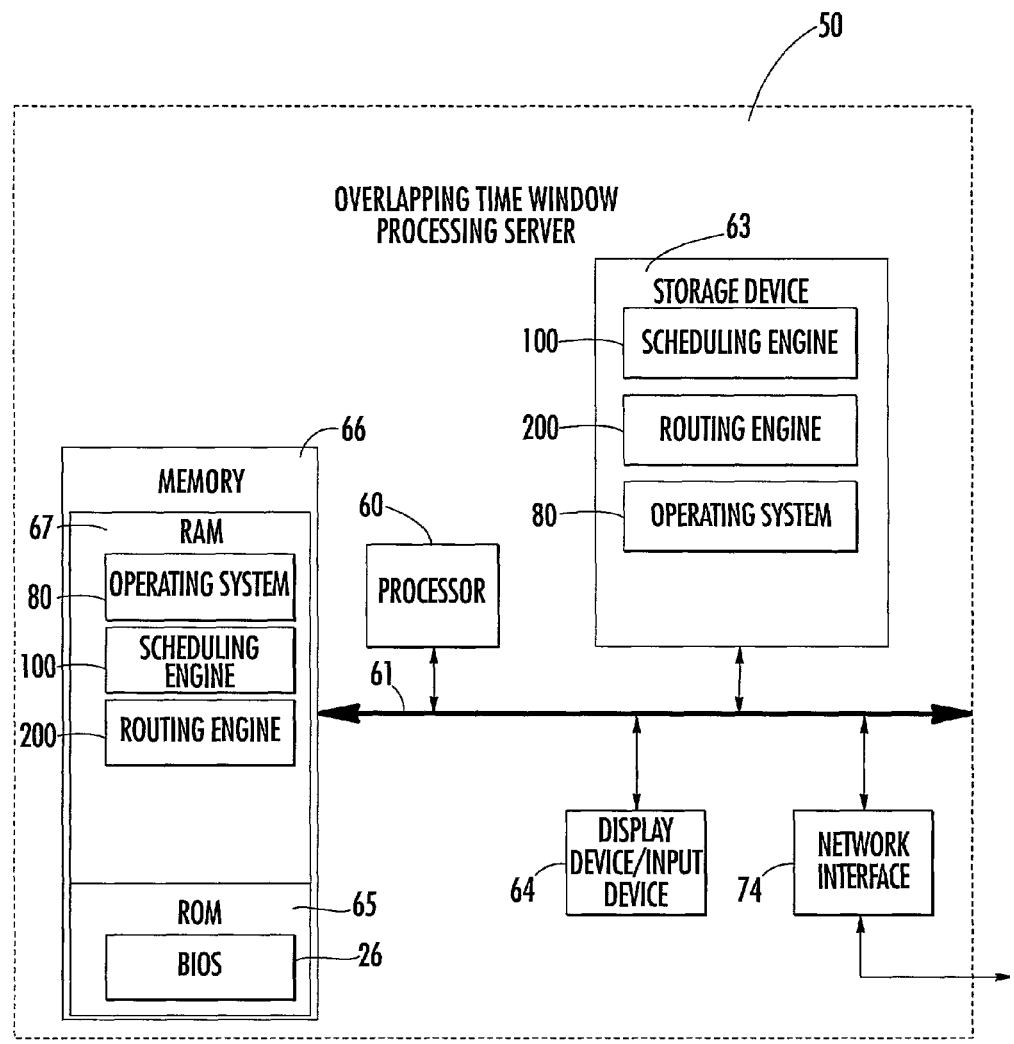
FIG. 4 is a block diagram of an Overlapping Time Windows Processing Server that is an embodiment of the present invention.

FIG. 4 shows a block diagram of an exemplary embodiment of the overlapping time window processing server 50 of FIGS. 2 and 3. The overlapping time window processing server 50 includes a processor 60 that communicates with other elements within the overlapping time window processing server 50 via a system interface or bus 61. Also included in the overlapping time window processing server 50 is a display device/input device 64 for receiving and displaying data. This display device/input device 64 may be, for example, a keyboard or pointing device that is used in combination with a monitor. The overlapping time window processing server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the time window processing server 50.

In addition, the overlapping time window processing server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the personal computer 20. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a scheduling engine 77 and a routing engine 78. The scheduling engine 77 and the routing engine 78 control certain aspects of the operation of the overlapping time window processing server 50, as is described in more detail below, with the assistance of the processor 60 and an operating system 80.

Also located within the time window processing server 50 is a network interface 74, for interfacing and communicating with other elements of a computer network. It will be appreciated by one of ordinary skill in the art that one or more of the time window processing server 50 components may be located geographically remotely from other time window processing server 50 components. Furthermore, one or more of the components may be combined, and additional components performing functions described herein may be included in the time window processing server 50.

Figure 5:
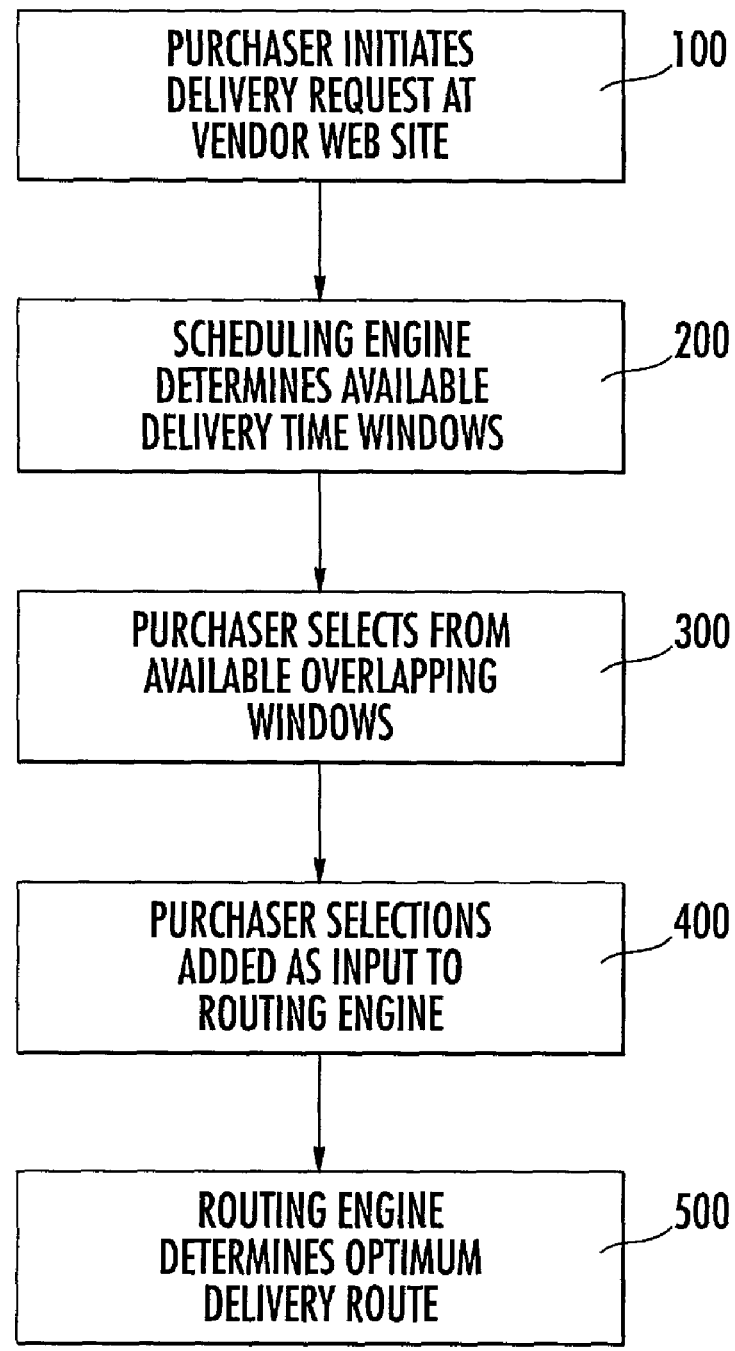
FIG. 5 is a flow chart showing the steps carried out by an embodiment of the method and system of the present invention.

FIG. 5 is a flow chart showing the steps carried out by an embodiment of the method and system of the present invention in connection with an Internet grocery delivery service. As show in window 100, a purchaser at the grocery delivery Internet site can initiate a delivery request via a conventional data interface. After the purchaser initiates a delivery request, the system may request that the purchaser indicate a general time frame for delivery (such as the day desired or the shift), in which case at window 200 of FIG. 5, a scheduling engine will determine and display for the purchaser the available time windows within that general time frame.

Figure 6:
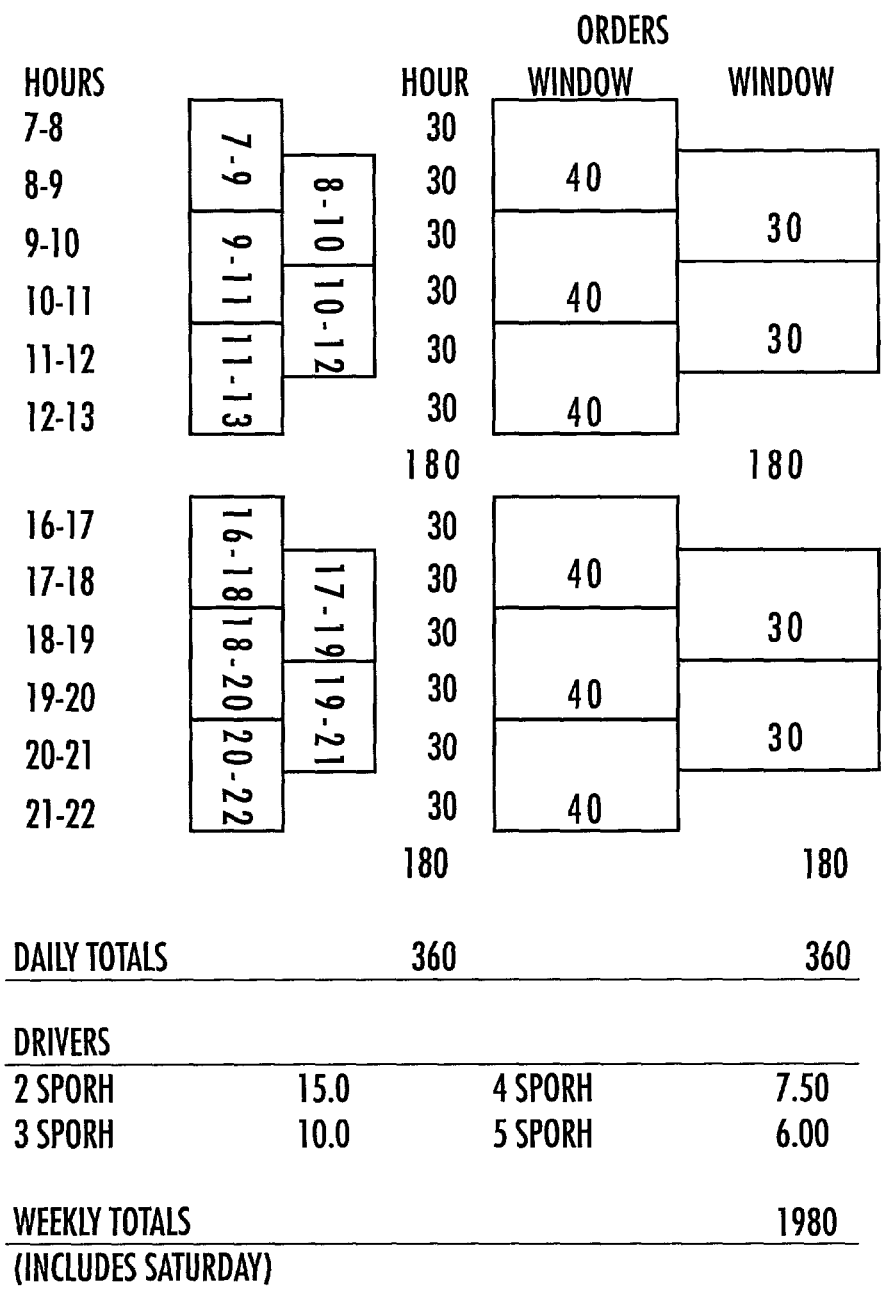
FIG. 6 is a schematic diagram of a model according to the invention for delivering one hundred eighty (180) delivery orders per shift.

Referring back to FIG. 1, a typical selection of time windows offered by conventional systems for a particular day include such delivery times as 7:00 to 9:00 a.m., 9:00 to 11:00 a.m. and 11:00 to 1:00 p.m. As shown in FIG. 6, however, the method and system of the present invention allows a purchaser to choose from additional overlapping time windows for delivery. An overlapping window is any window that includes any portion of two or more sequential time windows.

In the embodiment of two hour time windows with a one hour overlap shown in FIG. 6, a delivery day has been modeled with two shifts, morning and afternoon, with projected deliveries of one hundred eighty orders per shift, or 30 orders per hour. Thus, referring to the morning shift, a purchaser may choose not only the sequential time windows of 7:00 to 9:00 a.m., 9:00 to 11:00 a.m. and 11:00 to 1:00 p.m., but also overlapping times of 8:00 to 10:00 a.m. and 10:00 to 12:00 noon. Thus, the total set of overlapping time windows offered to the purchaser for morning delivery would be:

7 am-9 am|8 am-10 am|9 am-11 am|10 am-12pm|11 am-1 pm.

If the purchaser is not available to take a delivery at 7:00 a.m., but is available to take delivery at 8:00 a.m., the purchaser would not have to delay delivery until 9:00 a.m. Rather, that purchaser could choose the 8:00 to 10:00 a.m. time window. Likewise, for the afternoon shift modeled in FIG. 6, the overlapping time windows offered to the purchaser for afternoon delivery would be:

4 pm-6 pm|5 pm-7 pm|6 pm-8 pm|7 pm-9 pm|8 pm-10 pm.

In this embodiment, the time windows are two hours long, and the overlap is one hour. The maximum number of orders that will be accepted are shown in the right side columns of FIG. 6. The time windows of 7 am-9 am|9 am-11 am|11 am-1 pm|4 pm-6 pm|6 pm-8 pm 8 pm-10 pm have been assigned a maximum number of orders equal to 40, whereas the time windows of 8 am-10 am|10 am-12 pm|5 pm-7 pm|7 pm-9 pm have been assigned a maximum number of orders equal to 30. Through testing, this 4:3 ratio has been found to even out the deliveries over each shift. The actual maximum numbers for each time window may be altered based on the expected volume of deliveries, while maintaining the 4:3 ratio. Other ratios may also be used in accordance with the present invention, based upon empirical data.

FIG. 6 also demonstrates one of the advantages of using the overlapping delivery windows model. The term Stops Per On Road Hour (SPORH) represents the number of times a driver stops in a given hour to deliver items. The current SPORH through the grocery delivery industry is less than 2. By employing the method and system of the present invention, however, the SPORH increases significantly to between a range of 4 and 5. By increasing the SPORH in this manner the number of drivers required to achieve the same number of deliveries in a given amount of time decreases significantly. As FIG. 6 illustrates, a SPORH of 2 requires fifteen drivers whereas a SPORH of 5 requires only six drivers to achieve the same results. Thus, because there are more orders available to deliver at a given time under the method and system of the present invention, the SPORH increases, which reduces the number of drivers required to delivery items, the amount of miles the drivers are traveling decreases, the available customer contact time increases and the amount of down time a driver will incur waiting for a time window to open significantly decreases.

Although the present invention is discussed in connection with time windows that are two hours long, and an overlap of one hour, other overlapping configurations are also possible. For example, one hour time windows with a one-half hour overlap. In this configuration, the total set of overlapping time windows offered to the purchaser for morning delivery would be:

7 am-8 am|7:30 am-8:30 am|8 am-9 am|8:30 am-9:30 pm|9 am-10 am|9:30 am-10:30 am|10 am-11 am|10:30 am-11:30am|11 am-12 pm|11:30 am-12:30 pm|12 pm-1 pm.

Likewise, for the afternoon shift, the overlapping time windows offered to the purchaser for afternoon delivery would be:

4 pm-5 pm|4:30 pm-5:30 pm|5 pm-6 pm|5:30 pm-6:30 pm|6 pm-7 pm|6:30 pm-7:30 pm|7 pm-8 pm|7:30 pm-8: 30 pm|8 pm-9 pm|8:30 pm- 9:30 pm|9 pm-10 pm.

Figure 7:
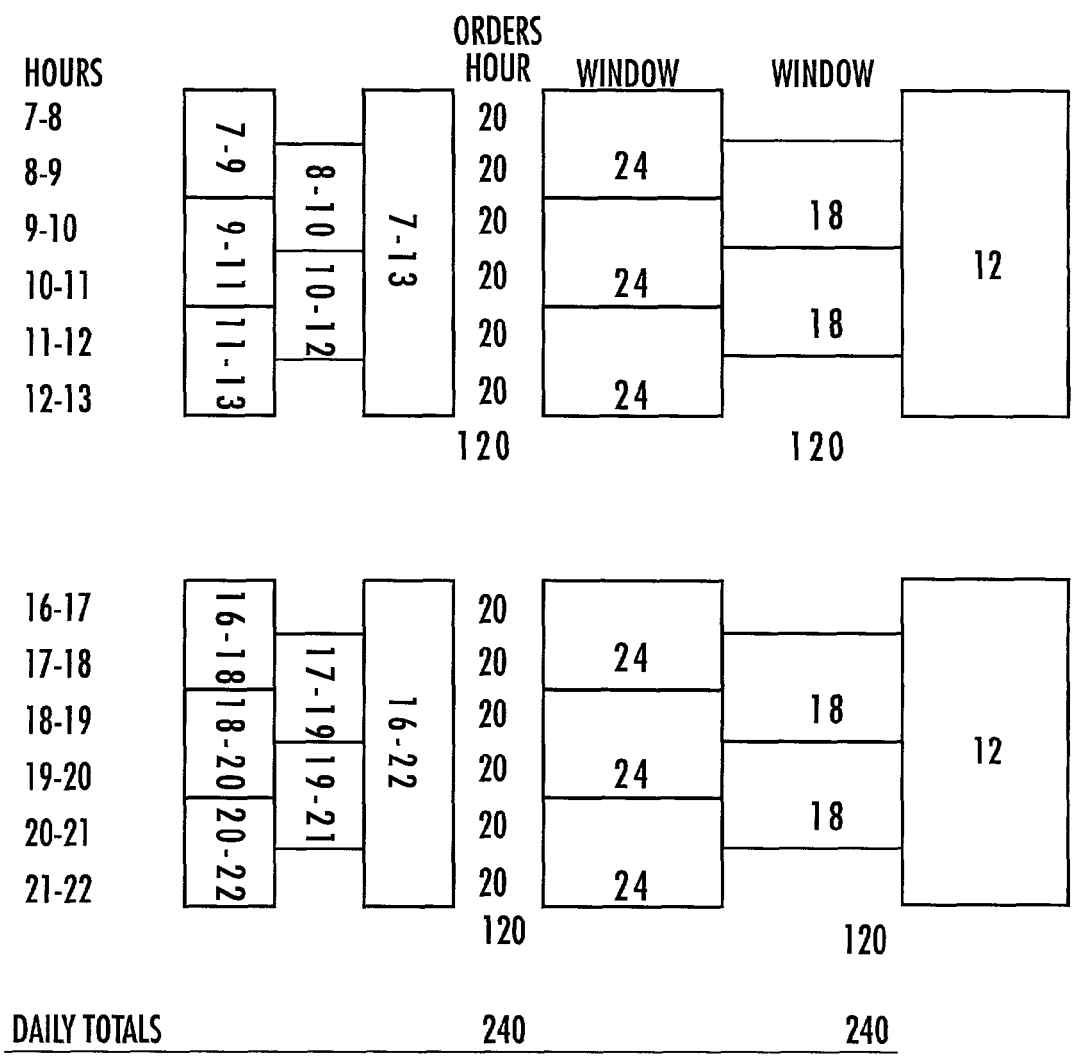
FIG. 7 is a schematic diagram of a model according to the invention that utilizes a set of overlapping windows and an additional overlapping window.

Other configurations of the length of windows and overlap are also contemplated to be within the scope of the present invention. FIG. 7, for example, illustrates an embodiment of the present invention having time windows that are two hours long, a set of overlapping windows that overlap the two hour windows by one hour, and an additional overlapping window that overlaps both the two hour windows and the set of overlapping windows.

Again referring to FIG. 5, in one embodiment, as part of window 200, the scheduling engine may apply selected predetermined parameters to the time windows to determine which windows to offer to the recipients as available time windows. The scheduling engine may apply selected criteria using "Available To Promise" (ATP) software of the type known in the art. The scheduling engine may, for example, determine which time windows have the least cost of service associated with them in making the delivery, based upon such parameters as the purchaser's location, the nature of the item or items to be delivered, the available capacity of assigned delivery vehicles, and other factors. For instance, if delivering an item within a particular time window would require adding capacity in the form of bringing another vehicle into operation, this time window may not be made available as a choice for the purchaser at window 200.

In a separate embodiment, the requirement that delivery within a time window cost less than or equal to a monetary threshold may be used as a parameter for making a time window available. An example of a method and system that accomplishes this task is disclosed in U.S. patent application entitled Real-Time Feasibility Analysis Systems And Methods filed on Mar. 16, 2001, which is incorporated by reference herein.

In an alternative embodiment, all time windows may be made available to recipients until they reach an assigned maximum numbers of orders. In this embodiment, the sequential time windows may be assigned a larger number of orders than the additional overlapping windows, with the ratio being selected to even out the deliveries over a shift.

Referring again to FIG. 5, at window 300, the purchaser chooses from the time windows made available by the scheduling engine as discussed above. If the scheduling engine is not programmed to use predetermined parameters to restrict available time windows, the purchaser will choose from all the time windows made available at window 100, and the scheduling engine will only determine if that time window is full at window 200.

At window 400 of FIG. 5, the purchaser's time window selections are added as input to a routing engine. At window 500, the routing engine determines the optimum route for the delivery drivers to follow in delivering the ordered item or items to the purchaser. Routing software for use in connection with the routing engine is commercially available from sources such as Roadnet Technologies, Inc., of Baltimore, Maryland, who distributes ROADNET 5000, a routing software product. Such software is designed to route and schedule delivery equipment quickly and efficiently, thereby reducing transportation costs, improve service to the customer, improve driver performance and save routing time. The ROADNET 5000 software uses algorithms to determine the most cost-efficient and customer-friendly routes possible by applying factors such as available drivers and equipment, driver rate of pay, equipment capacity, preferred and maximum route duration, multiple depots, changing traffic patterns throughout the day, fixed and variable services times, traffic and speed limits, road construction, Department of Transportation requirements, location, open/close time of multiple time windows, order size, delivery instructions and use of merchandisers. Another commercially available routing software is DeliveryNet.HOME routing solutions available from Descartes Systems Group of Waterloo, Ontario. Again, this software determines the most cost-efficient routes for delivery by applying a number of factors to the order and possible routes.

After the routing engine determines the optimum delivery route at window 500, the drivers follow the optimum route to make the deliveries.

The method and system according to the present invention provides a number of advantages over the prior art including providing more delivery times during the optimum part of the day - 5 p.m. through 9 p.m. and 8 a.m. through 12 p.m. -, providing more flexibility to consumers in choosing delivery times, providing more efficiency in executing the deliveries to the consumers and providing operations with more flexibility with staffing and scheduling of drivers. The present invention thereby reduces labor and delivery costs to the business and the consumer, increases the number of deliveries available and provides the consumer with better service.

Figure 8:
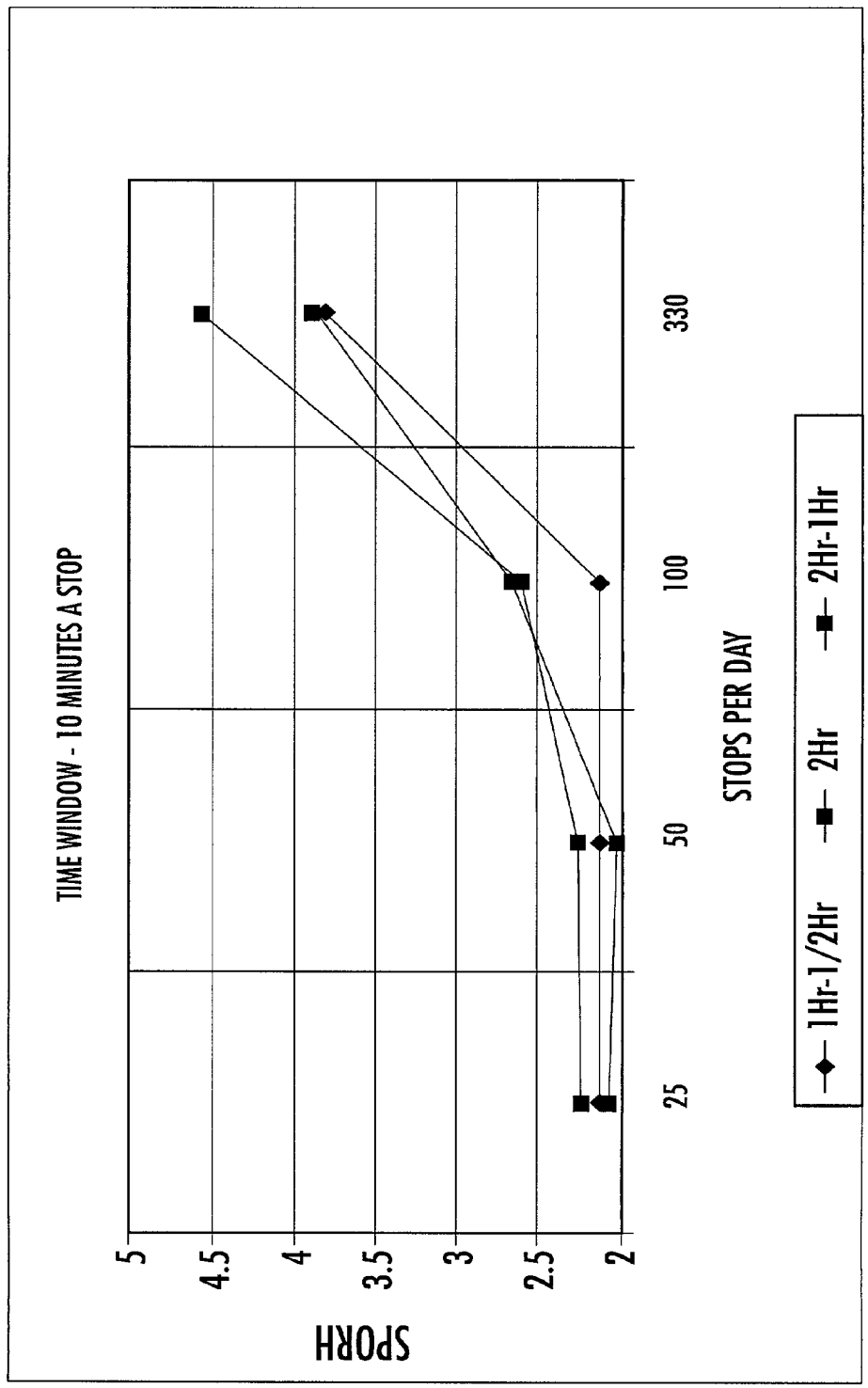
FIG. 8 is a line graph showing a comparison of time window configurations.
Figure 9:
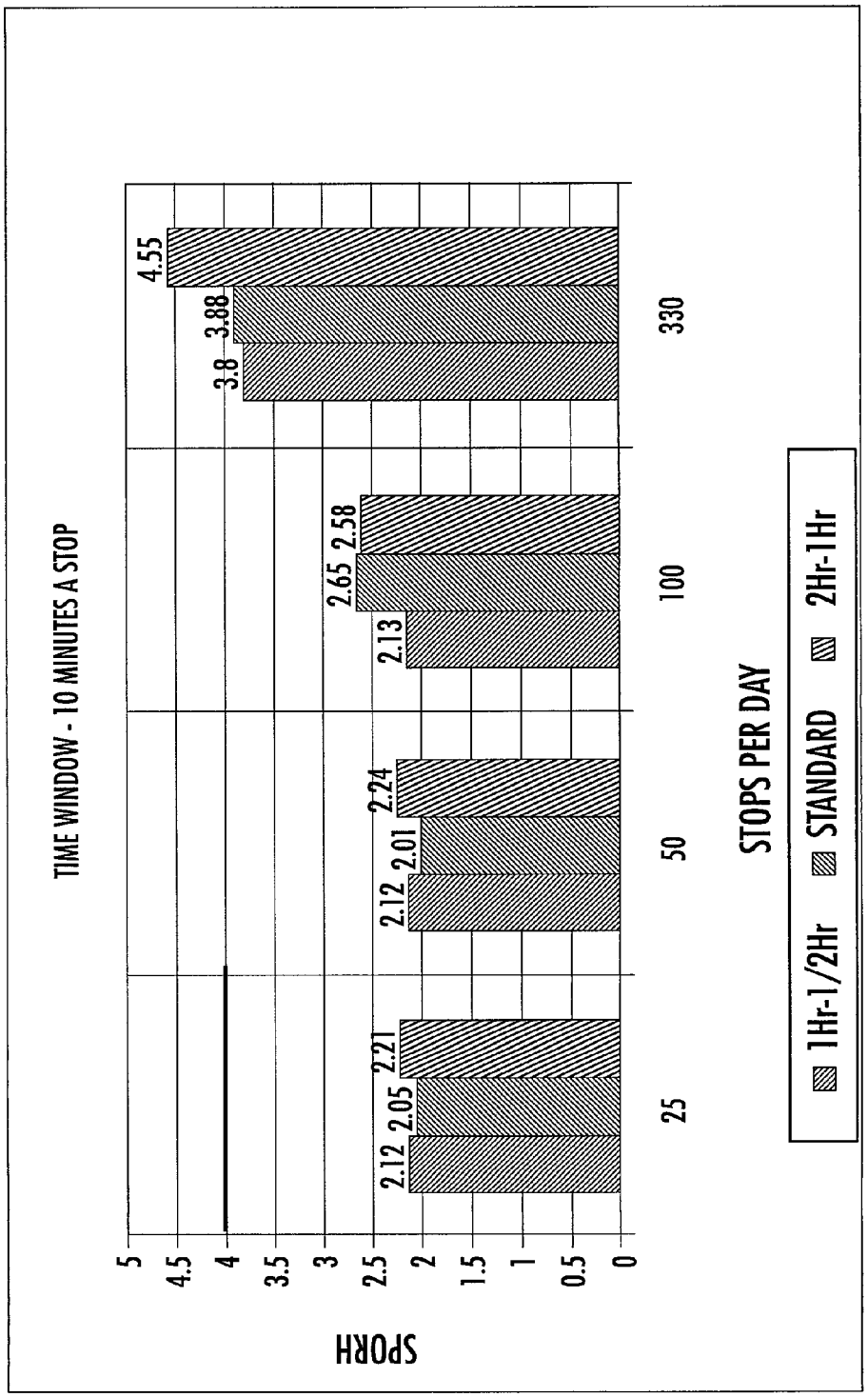
FIG. 9 is a bar graph showing a comparison of time window configurations.

There are also numerous advantages provided by the present invention by virtue of the use of a routing engine to determine the optimum delivery route. Specifically, the ROADNET 5000 routing software was used to simulate deliveries in the Norwalk/New Canaan, Connecticut area. Three separate simulations were conducted. The first using two hour windows with no overlapping, the second using one hour windows with one-half hour overlapping, and the third using two hour windows with one hour overlapping. The results of the simulations are shown in FIGS. 8 and 9. The graphs illustrate the correlation between the stops per day and the SPORH. As discussed earlier, as the stops per day increase, the SPORH also increases. Advantageously, in the simulation of the embodiment of the two-hour overlapping window configuration of the present invention, the SPORH increased at a much faster rate than under the other configurations.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

That which is claimed:

1. A method of obtaining desired delivery times from intended recipients of items, comprising:
   electronically identifying, via one or more processors, a plurality of time windows from which a recipient may select a time for delivery of an item, wherein said plurality of time windows includes (a) at least two sequential time windows and (b) at least one overlapping time window that overlaps a portion of each of the sequential time windows;
   electronically causing display of the plurality of time windows from which a recipient may select a time for delivery of an item; and
   electronically receiving, via the one or more processors, as input from the recipient a selection from the plurality of time windows.

2. A method of obtaining desired delivery times as defined in claim 1, wherein said causing display of step includes causing display of a plurality of time windows that include at least two sequential one hour time windows and at least one overlapping time window that overlaps each of the sequential time windows by one-half hour.

3. A method of obtaining desired delivery times from intended recipients of items, comprising:
   electronically identifying, via one or more processors, a plurality of time windows;
   electronically applying, via the one or more processors, predetermined parameters to said plurality of time windows to identify a subset of time windows of said plurality of time windows to offer to recipients as available times for delivery, wherein the subset of time windows includes (a) at least two sequential time windows and (b) at least one overlapping time window that overlaps a portion of each of the sequential time windows;
   electronically causing display of, via the one or more processors, said subset of time windows from which a recipient may select a time for delivery of an item; and
   electronically receiving, via the one or more processors, as input from a recipient a selection of a time window from said subset of said plurality of time windows.

4. A method of obtaining desired delivery times as defined in claim 3, wherein said causing display of step includes causing display of a plurality of time windows that include at least two sequential two hour time windows and at least one overlapping time window that overlaps each of the sequential time windows by one hour.

5. A method of delivering items, comprising:
   electronically causing display of, via one or more processors, offers of delivery items for sale to recipients;
   electronically identifying, via the one or more processors, a plurality of time windows;
   electronically applying, via the one or more processors, predetermined parameters to the plurality of time windows to identify a subset of time windows of the plurality of time windows to offer to recipients as available times for delivery, wherein the subset of time windows includes (a) at least two sequential time windows and (b) at least one overlapping time window that overlaps a portion of each of the sequential time windows;
   electronically causing display of, via the one or more processors, the subset of time windows from which a recipient may select a time for delivery of an item; and
   electronically receiving, via the one or more processors, as input from the recipient a selection from said subset of said plurality of time windows.

6. A method of delivering items as defined in claim 5, wherein said applying step includes determining which time windows of said plurality of time windows have associated with them the least cost of service in making the delivery.

7. A method of delivering items as defined in claim 6, wherein said applying step includes determining whether the cost of delivering the item within a time window of said plurality is less than a monetary threshold.

8. A method for implementing an on-line program for delivering items, comprising:
   electronically causing display of, via one or more processors, an Internet webpage accessible to at least one user for on-line interactive communications between the user and the Internet webpage;
   electronically identifying a plurality of available time windows for delivery, wherein the plurality of time windows includes (a) at least two sequential time windows and (b) at least one overlapping time window that overlaps a portion of each of the sequential time windows;
   electronically causing display of, via the Internet webpage, the plurality of available time windows for delivery; and
   electronically receiving, via the one or more processors, delivery time window selections as input made by the user.

9. A method for implementing an on-line program for delivering items as defined in claim 8 further comprising determining, via a scheduling engine, whether a maximum number of orders to be delivered within one of said plurality of time windows has been reached.

10. A method for implementing an on-line program for delivering items as defined in claim 8 further comprising determining, via a routing engine, an optimum delivery route for delivering the item to the user.

11. A method of displaying delivery time windows to a recipient, said method comprising the steps of:
   electronically identifying, via one or more processors, a plurality of time windows in which a delivery may be made to a recipient;
   electronically applying, via one or more processors, predetermined parameters to the plurality of time windows to identify a subset of time windows of the plurality of time windows to offer to the recipient as available times for delivery, wherein the subset of time windows includes (a) at least two sequential time windows and (b) at least one overlapping time window that overlaps a portion of each of the sequential time windows;
   responsive to applying predetermined parameters, causing display of, via the one or more processors, a subset of time windows of the plurality of time windows as being available for delivery; and
   electronically receiving delivery time window selections as input made by a user.

* * * * *